Feb. 5, 1957   R. O. JACKSON   2,780,467
ECCENTRIC BORING HEAD
Filed March 26, 1954   2 Sheets-Sheet 1
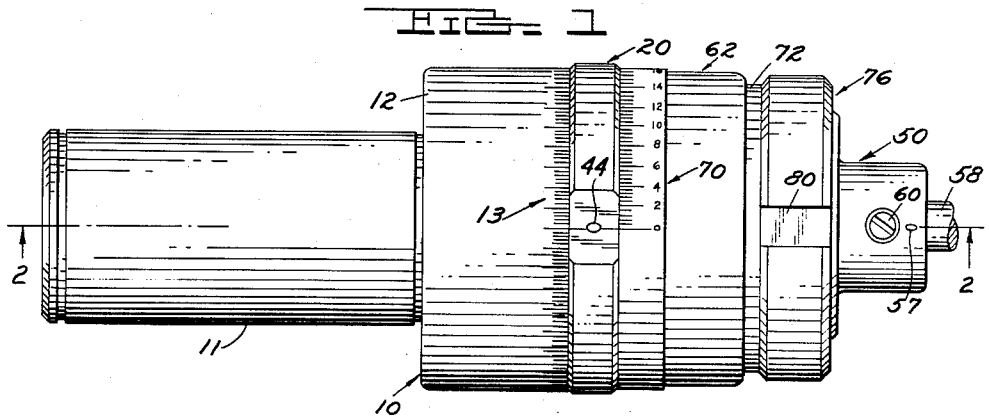
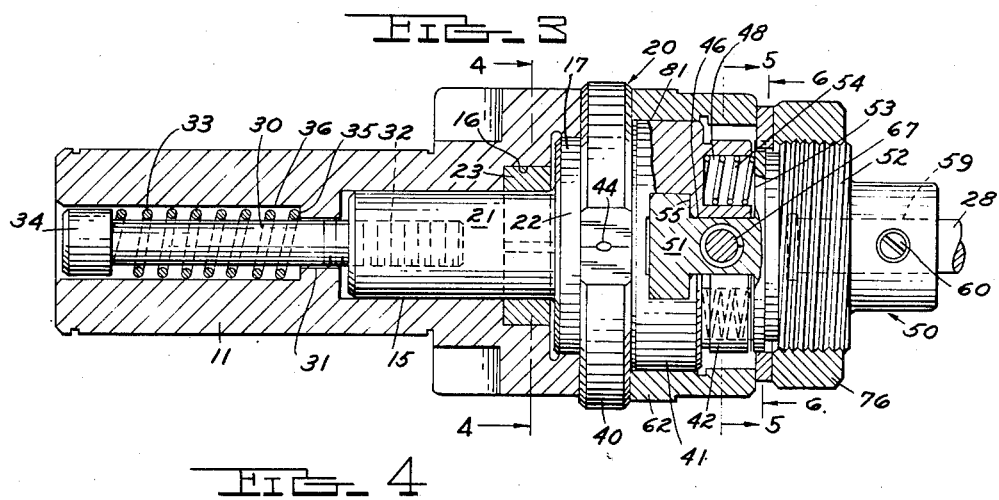
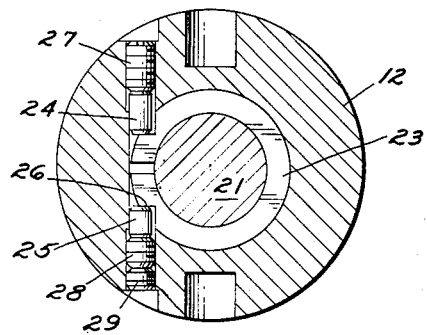
INVENTOR.
ROBERT O. JACKSON
BY Farley, Forster and Farley
ATTORNEYS Feb. 5, 1957  R. O. JACKSON  2,780,467
ECCENTRIC BORING HEAD
Filed March 26, 1954  2 Sheets-Sheet 2
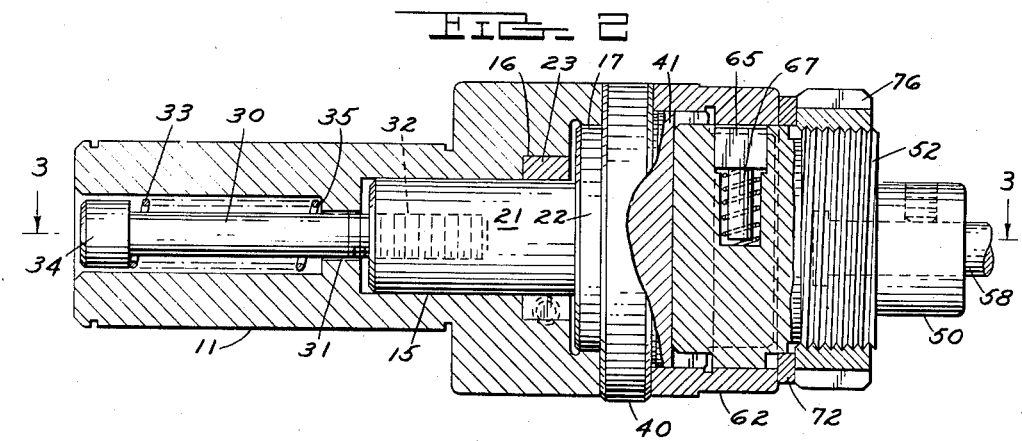
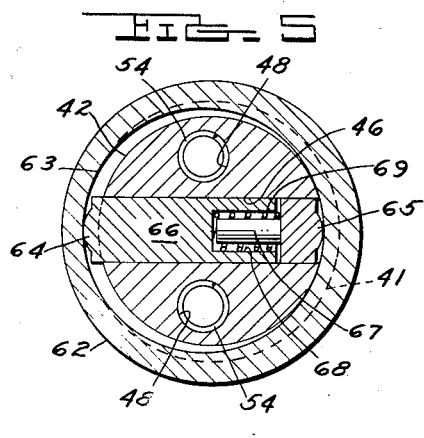
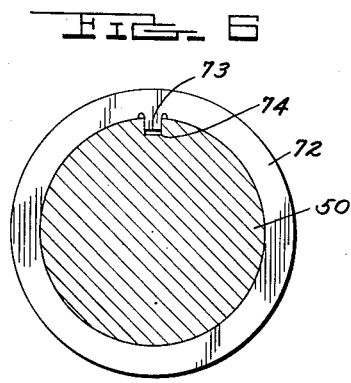
INVENTOR.
ROBERT O. JACKSON
BY Farley, Forster and Farley
ATTORNEYS

United States Patent Office 2,780,467
Patented Feb. 5, 1957

2,780,467
ECCENTRIC BORING HEAD

Robert O. Jackson, St. Clair Shores, Mich., assignor to Beaver Tool and Engineering Corporation, Royal Oak, Mich., a corporation of Michigan Application March 26, 1954, Serial No. 418,812

8 Claims. (Cl. 279—6)

This invention relates to a tool holder of the type commonly called a boring head, which mounts one of the usual hole forming or finishing tools. The construction provides a means for accurately positioning the working or cutting edges of the tool with respect to the longitudinal axis of the shank of the tool holder, thereby establishing the diameter of the hole to be formed by the tool.

Such positioning of the tool is provided in the construction of the invention in two ranges of adjustments, a coarse adjustment and a fine adjustment, with the fine adjustment range being an increment of the coarse adjustment range. For example, the coarse adjustment range may be calibrated in hundredths and thousandths of an inch, whereas the fine adjustment range will be calibrated in ten thousandths of an inch. Each adjustment, coarse or fine, can be independently set and locked without affecting the setting of the other, and the individual components of the construction are so designed and related that adjusting movement can be obtained without lost motion or backlash. Thus, the axis of the cutting tool can be accurately adjusted with relation to the axis of the machine tool spindle, and this relationship can be re-set for successive passes over the work without removing the tool holder from the machine.

Essentially, the tool holder consists of three main parts, a body which includes the shank, an adapter or intermediate member mounted on the body for movement with respect to the axis of the shank, and a tool carrying member mounted on the adapter for movement with respect to the axis of the adapter and the axis of the shank. The movement of one of these members provides the coarse adjustment, and the movement of the other member the fine adjustment previously mentioned. Two sets of locking elements are provided, one fixes the adapter member against movement relative to the body and the other fixes the tool carrying member against movement relative to the adapter.

Preferably, relative movement between the tool carrier and the adapter is employed for the coarse range of adjustment. A connection is employed between the tool carrier and the adapter which permits relative movement in a direction transverse to the axis of the tool holder. This movement is controlled by an eccentric cam, piloted on the adapter and engaging a follower on the tool carrier. Means for eliminating backlash are employed at the connection between the tool carrier and adapter, and also between the cam follower and cam.

Fine adjustment is obtained by the connection between the adapter and the body of the tool holder, which in the preferred construction consists in a bore formed in the body eccentric to the axis of the shank portion thereof, which is engaged by a cylindrical pilot formed as part of the adapter. This construction permits the coarse adjustment setting to be increased or decreased within the range of the fine adjustment.

The outer configuration of the parts is generally cylindrical, with the cam ring, adapter and body having adjacent cylindrical portions which are provided with suitable scales and indices graduated to show the relative axial position between tool carrier and adapter and between adapter and body. Preferably these scales are graduated in terms of the hole diameter dimension.

The accompanying drawings disclose a presently preferred constructional example of the invention, which will now be more completely described in order to more fully bring out the features thereof in terms of structure which has been successfully employed for putting the invention into practice. These drawings comprise the following views:

Fig. 1, an elevation of the construction;
Fig. 2, a sectional elevation taken on the line 2—2 of Fig. 1;
Fig. 3, a sectional elevation taken on a plane at right angles to the section of Fig. 2 as indicated by the lines 3—3 thereof;
Fig. 4, a transverse section taken along the line 4—4 of Fig. 3 showing the means for locking the adapter against movement relative to the body;
Fig. 5, a transverse section taken along the line 5—5 of Fig. 3 showing the cam follower construction employed between the tool carrier and adapter; and
Fig. 6, a transverse section taken along the line 6—6 of Fig. 3.

Referring to Figs. 1 and 3, the body of the boring head, generally designated by the reference 10, has a shank portion 11, and a cylindrical portion 12 of larger diameter which carries the index scale 13. Internally, the body is provided with a cylindrical bore 15, a recess 16 and a pilot surface 17. These three internal cylindrical surfaces are all formed on a center eccentric to the axis or center of the external diameter of the shank 11. In the construction illustrated, the displacement of the center of the cylindrical surfaces, 15, 16 and 17 from the center of the shank 11 is .0025 inch.

The intermediate or adapter member, generally designated by the reference 20, is formed with cylindrical portions 21 and 22 dimensioned to engage the bore 15 and pilot surface 17, respectively, of the body 10. A split bushing 23 is seated in the recess 16 of the body, which is provided, as shown in Fig. 4, with locking means for clamping the bushing about the cylindrical surface 21 of the adapter member 20. This locking means is conventional and consists of a pair of pins 24 and 25 received in a suitable hole formed transversely through the cylindrical portion 12 of the body and each engaging a shoulder or notch 26 formed on the bushing 23 adjacent the split portion thereof. The pin 24 is positioned by a single set screw 27. The pin 25 is positioned by a pair of set screws—the positioning screw 28 and the locking screw 29.

The adapter 20 is rotatably connected to the body by a cap screw 30 extending through a counterbored hole 31 formed along the axis of the body and engaging a threaded hole 32 formed in the end of the cylindrical portion 21 of the adapter. A spring 33 is positioned between the head 34 of the screw and the shoulder 35 at the end of the counterbored portion of the hole, and serves to force the screw to the left as the parts are viewed in Fig. 3, thus drawing the adapter 20 within the bore 15 of the body. With the small amount of eccentricity provided in the construction illustrated, as mentioned above, it is not necessary to provide an eccentric mounting of the connecting screw 30, the normal clearance between the screw and the hole 31 being sufficient.

The remaining portion of the adapter 20 is made up of a cylindrical ring 40, a cylindrical bearing section 41 and a cylindrical end section 42. Cylindrical ring 40 has a diameter slightly in excess of the diameter of the adjacent portion 12 of the body, and is knurled and provided with a zero reference index 44. This ring 40 serves as a knurled nut for turning the adapter 20 within, or relative to the body 10.

A T-shaped slot 46 is formed transversely through the cylindrical portions 41 and 42 of the adapter, and a pair of holes 48 (Fig. 5) are formed in the end of the section 42.

The tool carrying member, generally designated by the reference 50, is formed with a T head 51 adapted to be received slidably within the T slot 46 of the adapter, and with a cylindrical section which includes the threaded portion 52. The cylindrical portion begins at the base of the T head 51, providing a radial surface 53 extending adjacent the end surface of the adapter. Springs 54 are inserted in the holes 48 of the adapter and bear against the adjacent surface 53 of the tool carrier 50, thus drawing the adjacent shoulders 55 of the T slot 46 and T head 51 into firm engagement. The outer end 56 of the tool carrier is necked down, and provided with a zero index 57. A tool shank 58 is received in a bore 59 and retained by a set screw 60.

The cylindrical surface 41 of the adapter serves as a bearing for a cam ring 62 which is fitted for rotation thereon. This cam ring includes an internal eccentric cam surface 63, best shown in Fig. 5. Referring to this view, the cam surface 63 is engaged by a fixed cam follower 64 and a floating cam follower 65, both of these being included as part of the construction of the neck portion 66 of the T head 51 of the tool carrier. Floating cam follower 65 includes a stem 67 which is received within a hole 68 formed in the portion 66, along with a spring 69 which serves to force the floating follower 65 outwardly into engagement with the cam surface 63. The cam ring 62 is provided with a scale 70 for indicating the position of the axis of the tool carrier 50 relative to the axis of the adapter 20.

The assembly is completed by a washer 72 (Fig. 6) having a lug 73 which engages a slot 74 in the tool carrier, and by a lock nut 76 which engages the threaded portion 52 thereof. Tightening the nut 76 draws the tool carrier outwardly relative to the adapter to seat the T head 51 of the carrier firmly against the shoulders 55, and at the same time forces the cam ring 62 inwardly against the cylindrical portion 40 of the adapter. The combined frictional engagement between the parts created by tightening movement of the nut thus locks the cam ring against rotation and at the same time locks the T section of the tool carrier against sliding movement in the T slot 46.

The exact relationship between the parts can perhaps be more clearly understood with the aid of a brief explanation of one manner in which they can be assembled. Referring to Fig. 3, the split bushing 23 is first placed within the cylindrical surface 16 of the body 10 of the tool holder. The cylindrical or shank portion 21 of the adapter 20 is then inserted within the split bushing 23 and into the eccentric bore 15 of the body 10.

Spring 33 is then placed over the shank of the cap screw 30, the cap screw is inserted through the hole 31 in the body, and the threaded portion thereof engaged with the threaded hole 32 of the adapter. The adapter is now assembled to the body.

The pins 24 and 25, and adjusting screws 27 and 28 can then be inserted in the body in the relationship shown in Fig. 4 to engage the split bushing 23. Zero mark 44 on the adapter is set at zero on the scale 13 of the body and the split bushing then clamped around the shank 21 of the adapter to lock adapter and body in zero position.

Springs 54 are inserted in the holes in the end face of the adapter and then the T head 51 of the tool carrier 50 is slipped into the T slot 46 of the adapter, the springs 54 being compressed against the face 53 of the tool carrier during the operation. Cam follower 65 and spring 69 are assembled to the tool carrier in the relationship shown in Fig. 5. Then, with the tool carrier centered in the T slot of the adapter, the cam ring 62 is slipped over the end of the parts, and the cam follower 65 depressed against the force of its spring 69 so that the cam followers 64 and 65 will be brought into engagement with the cam surface 63 of the cam ring 62 while the concentric cylindrical surface of the cam ring is positioned around the cylindrical surface 41 of the adapter.

Thrust washer 72 is then assembled to the tool carrier (see Fig. 6) and then the lock nut 76 can be turned on to the threaded portion 52 thereof. Before tightening the lock nut, the cam ring 62 is rotated to bring the zero of its scale 70 into alignment with the zero marker 44 on the ring 40 of the adapter, with the parts in this relationship, the lock nut 76 is then tightened with the aid of a suitable spanner engaging a slot 80 in the outer surface thereof and the assembly is locked in zero relationship where the axis of the bore 59 of the tool carrier which receives the tool 58, is located on the axis of the shank 11 of the body of the tool holder.

Assuming that the shank 58 is that of a conventional boring tool, the cutting edge of the tool is positioned in approximate alignment with the zero mark 57 of the tool carrier (Fig. 1). Adjustment of the diameter of the hole formed by the cutting tool can be made in either or both of two ways, depending upon the diameter desired and the specific construction of the tool holder. This can probably best be explained with reference to a specific construction. For example, it has been previously mentioned that the amount of eccentricity of the bore 15 in which the shank 21 of the adapter is mounted is .0025 inch in the construction illustrated. The scale 13 on the body 10, which measures the amount of rotation of the adapter shank in the eccentric hole of the body is graduated so that one graduation of the scale indicates an adjustment of .0001 inch on the diameter of the hole being formed. A total amount of adjustment of plus or minus .005 inch on the diameter of the hole being formed is thus provided by relative movement between the adapter and the body.

Also in the specific construction disclosed, the cam ring 62 is formed so that the cam surface 63 thereof is machined on a center eccentric .060 inch to the center of the pilot surface 81 thereof. The scale 70 of the cam ring is laid out so that one graduation thereof indicates an adjustment of .005 inch on the diameter of the hole being formed. A total adjustment of .240 inch on the diameter of the hole being formed is available wtih these dimensions.

With this in mind, the required amount of adjustment of the tool on the diameter of the hole is determined. If this is less than plus or minus .005 inch, the desired tool setting is obtained by loosening the lock and set screws 29 and 28 (Fig. 4) to permit the adapter to be rotated in the body, and engaging the knurled ring 40 of the adapter and moving it until the zero mark 44 has passed the required number of graduations, plus or minus, on the scale 13 of the body.

If the total adjustment required is more than plus .005 inch on the diameter of the hole, the lock nut 76 is loosened and the cam ring 62 rotated to give a setting to the nearest increment of .005 inch. The lock nut is then tightened. If a finer setting is necessary it can be obtained by loosening the split bushing, and adjusting the adapter in the body as described above. In the specific construction illustrated, movement of the cam ring thus gives a coarse adjustment, and one which is free of backlash due to the construction employed for the cam followers 64 and 65, as shown in Fig. 5. Any lost motion is taken up by the spring 69. A fine adjustment, either plus or minus, results from the eccentric mounting of the shank 21 of the adapter, and with accurate machining of the parts, this adjustment is also free from backlash. When the scales 13 and 70 are accurately laid out, the fine and coarse adjustments indicated by each will be precisely obtained.

The tool holder construction materially decreases the setup and machining time for precision boring operations. Aside from the fact that precise tool settings can be obtained, both fine and coarse adjustments are entirely independent of each other. A setting obtained by one adjustment can be changed without affecting a setting obtained by the other, and either fine or coarse adjustments can be made without removing the holder from the machine spindle or disturbing its position therein and likewise without disturbing the position of the tool in the holder.

The construction is one that can be produced well within the limits of cost for the degree of accuracy of the tool settings obtainable.

The foregoing description is intended as illustrative only of the principles of the invention defined in any of the following claims.

I claim:

1. A holder for positioning a tool with respect to an axial reference line on a workpiece, comprising a body including a shank, an adapter member rotatably carried by said body on an axis eccentric to the axis of the shank thereof, means for locking said adapter member against such rotation, a tool carrier member connected to said adapter member for lateral movement with respect to the said adapter and to the axis of said shank, means for locking said tool carrying member against said lateral movement, the range of movement of one of said members relative to the axis of the shank of said body being an increment of the range of movement of the other of said members thereto.

2. A tool holder construction including a body having a shank portion adapted for mounting in a machine, a tool carrier member, and an intermediate member carried by said body for relative lateral movement between the center of said intermediate member and the center of the shank portion of said body, interlocking surfaces formed on said tool carrier and said intermediate member, resilient means interposed between said tool carrier and said intermediate member to normally urge the said interlocking surfaces thereof into engagement, means for producing relative movement between the interlocking surfaces of said tool carrier and said intermediate member, and means for locking said tool carrier and intermediate member against such movement between the interlocking surfaces thereof.

3. A tool holder construction according to claim 2 further characterized by said means for producing relative movement between the said interlocking surfaces of said tool carrier and intermediate member comprising an adjusting member having an internal cylindrical surface and an internal surface eccentric thereto, one of said surfaces being rotatably piloted on one of said members, and follower means carried by the other of said members engaging the other of said surfaces.

4. A tool holder construction according to claim 3 further characterized by said intermediate member being connected to said body for rotation on an axis eccentric to the axis of the shank portion thereof, said connection including resilient means normally urging said intermediate member into juxtaposition with said body.

5. A tool holder construction including a body, a tool carrier member, and an intermediate member mounted on said body and supporting said tool carrier member, said body having a shank portion and a portion adjacent thereto which is generally cylindrical in external contour, supporting surfaces formed on said body and said intermediate member for rotation of the latter relative to said body, means for locking said intermediate member against such rotation, the said supporting surface of said body being formed on an axis eccentric to the axis of the shank portion thereof, and on diameter less than the diameter of the cylindrical portion thereof, said intermediate member having a cylindrical portion positioned adjacent the said cylindrical portion of said body and having a diameter on the order of the diameter of said cylindrical portion of the body, interengaging surfaces formed on said intermediate member and said tool carrier transversely to the axis of the latter, a positioning ring rotatably carried by said intermediate member and having an internal cam surface engaging a follower formed on said tool carrier, the diameter of said positioning ring being substantially equal to the diameter of the said cylindrical portions of said intermediate member and said body, locking means for preventing rotation of said positioning ring relative to said intermediate member, a scale carried by said positioning ring and calibrated with relation to the shape of said cam surface, a scale carried by the cylindrical portion of said body and calibrated with relation to the eccentricity of said supporting surfaces thereof, and an index mark provided on the cylindrical portion of said intermediate member.

6. A tool holder construction comprising a body including a shank, an intermediate member, and a tool carrier member, means connecting said tool carrier member to said intermediate member for lateral movement relative thereto comprising axially abutting interengaging surfaces formed on said tool carrier and intermediate members transversely thereof, a positioning ring rotatably carried on said intermediate member, said positioning ring having an internal cam surface adapted to engage cam follower means formed on said tool carrier member whereby rotation of said positioning ring produces relative movement between said interengaging surfaces of said tool carrier and intermediate members, a tool socket formed on said tool carrier axially thereof, means provided on said body and said intermediate member for supporting the latter member for rotation relative to said body on an axis eccentric to the axis of the shank portion of said body whereby the axis of the tool socket of said tool carrier can be adjusted in a direction towards or away from a position of alignment with the axis of said shank by rotation of said intermediate member in either direction relative to said body.

7. A tool holder comprising a tool carrier member having tool supporting means formed axially thereof, a generally cylindrical intermediate member, means connecting said tool carrier member to said intermediate member for relative lateral movement between the axis of said tool supporting means and said intermediate member, positioning means carried by one of said members for defining the relative axial position therebetween, a body having a shank portion, means for connecting said intermediate member to said body for relative rotation on an axis eccentric to the axis of said shank portion whereby the axial position of said tool carrier relative to said intermediate member can be increased or decreased relative to said body by rotation of said intermediate member.

8. A tool holder construction according to claim 7 wherein the means for connecting said tool carrier to said intermediate member comprise a T element formed on said tool carrier and a complementary T slot formed on said intermediate member transversely to the axis thereof, resilient means interposed between said tool carrier and said intermediate member to exert a normal axial separating force, said force being opposed by the abutting surfaces of said T element and said T slot, means for producing relative lateral movement between the axes of said tool carrier and said intermediate member comprising a positioning ring rotatably carried by said intermediate member, said positioning ring having a cam surface engaging a cam follower carried by said tool carrier, and a locking element threadably carried by said tool carrier and adapted to be drawn into engagement with said positioning ring to lock the same against an abutting surface of said intermediate member and thereby increase the frictional engagement between said T element and T slot.

References Cited in the file of this patent

UNITED STATES PATENTS

| | | |
|---|---|---|
| 1,718,089 | Tesoroni | June 18, 1929 |
| 2,120,638 | Yotta | June 14, 1938 |